United States Patent [19]
Leighton et al.

[11] Patent Number: 5,519,778
[45] Date of Patent: May 21, 1996

[54] METHOD FOR ENABLING USERS OF A CRYPTOSYSTEM TO GENERATE AND USE A PRIVATE PAIR KEY FOR ENCIPHERING COMMUNICATIONS BETWEEN THE USERS

[75] Inventors: Frank T. Leighton, Newtonville, Mass.; Silvio Micali, 459 Chestnut Hill Ave., Brookline, Mass. 02146

[73] Assignee: Silvio Micali, Brookline, Mass.

[21] Appl. No.: 312,567

[22] Filed: Sep. 26, 1994

Related U.S. Application Data

[63] Continuation of Ser. No. 106,932, Aug. 13, 1993, abandoned.

[51] Int. Cl.⁶ .................................. H04L 9/08; H04L 9/30
[52] U.S. Cl. ................................................ 380/30; 380/21
[58] Field of Search .......................................... 380/30, 21

[56] References Cited

U.S. PATENT DOCUMENTS

| | | | |
|---|---|---|---|
| 5,124,117 | 6/1992 | Tatebayashi et al. | 380/30 |
| 5,144,665 | 9/1992 | Takaragi et al. | 380/30 |
| 5,199,070 | 3/1993 | Matsuzaki et al. | 380/30 |
| 5,202,921 | 4/1993 | Herzberg et al. | 380/21 |
| 5,241,599 | 8/1993 | Bellovin et al. | 380/30 |
| 5,272,755 | 12/1993 | Miyaji et al. | 380/30 |
| 5,276,737 | 1/1994 | Micali | 380/30 |
| 5,315,658 | 5/1994 | Micali | 380/30 |

OTHER PUBLICATIONS

"Perfectly–Secure Key Distribution for Dynamic Conferences" Blundo, et al.; Crypto '92, pp. 11–6–11–13.
"Key Storage in Secure Networks" Mitchell, et al.; Discrete Applied Mathematics 21 (1988), pp. 215–228.
"Using Encryption for Authentication in Large Networks of Computers" Needham, et al.; Communications of the ACM (Dec. 1978), pp. 993–999.
"Securely Replicating Authentication Services" Gong, Li; IEEE 1989, pp. 85–91.
"An Optimal Class of Symmetric Key Generation Systems" Blom, Rolf; Advances in Cryptology: Proceedings of Eurocrypt '84; Lecture Notes in Computer Science; pp. 335–338.
"An Optimal Algorithm for Synchronous Byzantine Agreement" Feldman, et al.; MIT Laboratory for Computer Science (Jun. 1990).
"Data & Computer Security: Dictionary of Standards Concepts and Terms: " Longley, et al.; Macmillan Publishers (1987) pp. 11–13, 182–185, 188–191.
"Crypto Users'Handbook" Christoffersson, et al.; Elsevier Science Publishing Company, Inc. (1988) pp. 39–47, 66–67, 72–73.

*Primary Examiner*—Salvatore Cangialosi
*Attorney, Agent, or Firm*—David H. Judson

[57] ABSTRACT

The present invention describes a method for enabling users of a cryptosystem to agree on secret keys. In one embodiment, a trusted agent chooses at least one individual key for each user, with at least a portion of such individual key being secret. At least some of the individual keys are then stored in physically secure devices, and the pair of users i and j use their individual keys to compute a common secret key. In another embodiment, each trustee of a group of trustees choose at least one individual key for each user, with at least some portion of such individual key being secret. The keys chosen by a sufficiently small number of such trustees, however, are insufficient for computing the common secret key of the users. Other hardware and software key exchange protocols based on these two techniques are also disclosed.

25 Claims, 1 Drawing Sheet

COMPUTATION OF INDIVIDUAL KEYS

USER i COMPUTES THE PRIVATE PAIR KEY $K_{ij}$

USER i SENDS CIPHERTEXT TO USER j

_5,519,778_

METHOD FOR ENABLING USERS OF A CRYPTOSYSTEM TO GENERATE AND USE A PRIVATE PAIR KEY FOR ENCIPHERING COMMUNICATIONS BETWEEN THE USERS

This is a continuation of co-pending application Ser. No. 08/106,932 filed on Aug. 13, 1993, now abandoned.

TECHNICAL FIELD

The present invention relates generally to secure message techniques and more particularly to a method for enabling users of physically-secure devices to agree on a private key.

BACKGROUND OF THE INVENTION

Conventional cryptographic algorithms allow two users, who already possess a common secret key, to exchange private messages even when communicating over a public network. Such systems possess very fast software implementations, inexpensive and fast hardware implementations, and, most importantly, are very secure. In fact, their security simply relies on one-way functions: functions f that are easy to evaluate but hard to invert, that is, for which it is hard, given a generic value $z=f(x)$, to find any value y such that $f(y)=z$.

Despite these main advantages, conventional cryptosystems, however, are not very useful. Prior exchange of a common secret key (e.g., by physically meeting in a secure location) with every person with whom one wants to talk to in private is, to say the least, cumbersome in most scenarios.

To overcome this difficulty, several methods have been developed to allow two people to agree on a common secret keys in a convenient manner. Unfortunately, however, until now all publicly known protocols for this task are either based on the assumed computational difficulty of a given number theoretical problem (as in the Diffie-Hellman algorithm and the RSA algorithm), or they rely on a non-realistic amount of trust.

In the case of RSA, the encryption function $f(x)$ typically is $x^e$ mod n, where n is a publicly-known product of two large prime integers $P_1$ and $P_2$ (known only to the user who publishes n and e), and e is a publicly known exponent (relatively prime with $P_1$ and $P_2$). In the RSA system, if a user X publishes two values e and n as above, then user Y can select a secret key k in an arbitrary manner and communicate it privately to X, by looking up X's publicized values, computing $k'=k^e$ mod n, and sending k' to X over a public network. If computing e-roots modulo a composite integer whose factorization is not known is a virtually impossible computational problem, then only user X will be capable of retrieving k from k'; in fact, only X knows n's factorization (i.e., $P_1$ and $p_2$), and this knowledge makes extracting e roots feasible, though not trivial.

In the case of the Diffie-Hellman scheme, two users X and Y, respectively possessing public keys $g^x$ mod p and $g^y$ mod p (where p is a prime integer and g a generator mod p), and corresponding secret keys x and y, agree on a common secret key $g^{xy}$ mod p as follows. User X computes a value $g^{yx}=(g^y)^x$ mod p (which he can do because he knows Y's public key and his own secret key); user Y computes $g^{xy}=(g^x)^y$ mod p (which she can do because she knows X's public key and her own secret key. Since multiplication is commutative, $g^{yx}=g^{xy}$ mod p is the desired common secret key.

In both the RSA and the Diffie-Hellman algorithms, however, the operations involved for secret-key exchange are quite time-consuming in software (computations of the type $a^b$ mod c are not-trivial whenever these values are large), or they require complex and expensive VLSI chips for fast modular exponentiation. Thus, building large-scale systems for secret-key exchange using such techniques would require a great financial investment.

More importantly, the assumptions necessary for the above secret-key exchange schemes to be secure are very rigid. In the case of RSA, secret-key exchange is performed by means of an encryption function, $f(x)=x^e$ mod n, that should not simply be one-way, but should also possess a secret (i.e., the factorization of n) knowing which inverting f (i.e., computing x from $f(x)$) should become possible rather than practically impossible. While it is widely believed that one-way functions exist, fewer researchers believe that one-way functions possess this additional property. Similarly, in the case of Diffie-Hellman, $g^x$ mod p not only needs to be one-way, but it should also possess additional algebraic and multiplicativity properties. Again, few people believe that one-way functions satisfying such additional algebraic constraints exist. Indeed, continuous algorithmic advances are made that make factoring integers and solving the discrete logarithm problem easier.

Therefore, conventional cryptography does not provide any efficient means to achieve secret-key exchange.

Other algebraic schemes for secret-key exchange have been devised by Blom and by Blundo et al., but these schemes rely upon an unrealistic amount of trust. In fact, not only do these schemes require a central authority that knows all the individual secret keys of the users, but also that essentially that all of the users in a large system are trustworthy. For instance, in Blom's case, as described in an article titled "An Optimal Class of Symmetric Key Generation Systems," *Advances in Cryptology: Proceedings of Eurocrypt 84, Lecture Notes in Computer Science*, Vol. 209, Springer-Verlag, Berlin, 1987, pp. 335–338, a trusted authority prepares and distributes keys to a group of n users. If each user key is B • R-bit long, the authority can compute from his own key (without interaction) a k-bit long common secret key for every other user in the system. All these keys will remain secret, unless k of the users collaborate and reveal to each other the keys in their possession. If this happens, they can compute the secret keys of every other user in the system.

Moreover, with such schemes few bad users may achieve the same results of many more bad users by forcing good ones to surrender their own secret keys. While in other schemes forcing some users to reveal their own keys may allow an enemy to understand at most the communications of those users (who will be aware of having lost privacy), in these algebraic schemes an enemy who has forced a sufficient number of users to reveal their own secret keys will understand the communications of all users, which is obviously untenable.

In sum, therefore, prior art techniques are inadequate for setting up truly viable secret-key exchange systems, especially where such systems are designed for large-scale use where the number of potentially dishonest users is enormous and there is no single individual that all users would trust to know their keys.

BRIEF SUMMARY OF THE INVENTION

It is therefore a principal object of the present invention to provide for new secret-key exchange protocols for users of crytosystems.

It is another principal object of this invention to devise secret-key exchange schemes that remain practical even on a national scale, and when there is no single individual or entity that all users would trust to know their keys.

It is a further object of the invention to provide novel secret-key exchange schemes that rely on conventional cryptographic tools, such as one-way functions without any further property, or secure hardware. Secure hardware has a portion that is tamperproof, and thus the information contained in it may be destroyed but is otherwise unreadable and untamperable.

It is yet a further object of the present invention to provide new and alternative algorithms for key exchange that are not based on the assumed difficulty of some particular number theoretic problem and which are thus immune from any algorithmic advances that may be made in the future.

It is still another important object to provide key exchange techniques that are particularly well-suited for use with secure hardware and that are very fast and very economical to implement.

It is another object of the invention to make use of trustees for turning conventional cryptosystems into secret key exchange protocols. According to the invention, a mechanism is provided by which two users i and j can compute a secret pair key $K_{i,j}$ that is known only to themselves (and, if desired, trusted agents). This key is then used as a private key to encrypt a randomly-generated session key which is used to encrypt the session traffic using a secure hardware chip. Each solution has the property that the pair key can be computed by each party without prior communication between the parties. For example, user i can compute $K_{i,j}$ without communicating with user j. Similarly, the receiver of a message can compute $K_{i,j}$ without additional communication with the sender. The first two solutions are hardware-based in the sense that they rely on the difficulty of extracting secret keys from the protected memory of a chip. These schemes are parameterized in terms of the number of chips that need to be "opened" before an adversary can successfully eavesdrop. The third solution is software-based and it does not rely on protected memories or tamper-proof chips. This scheme relies on trustees, only some of whom need to be honest.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in conjunction with the accompanying drawing in which.

DETAILED DESCRIPTION

Figure 1:
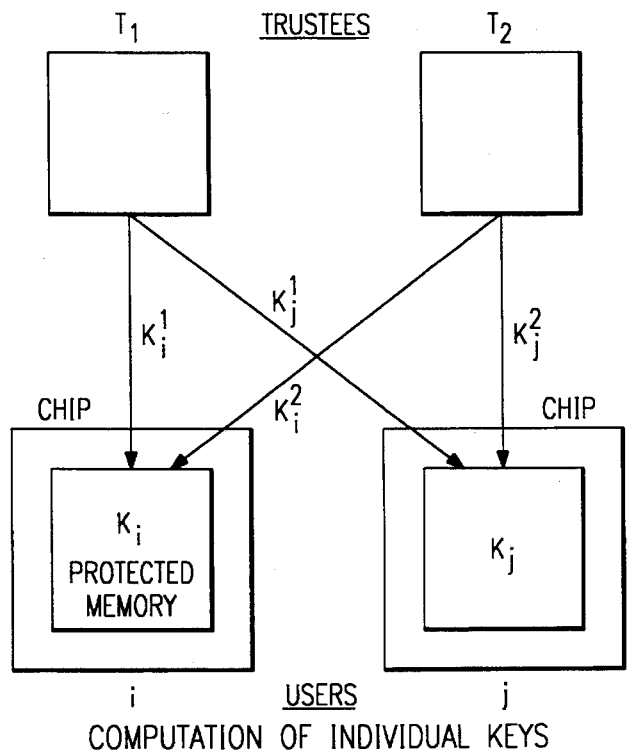
FIG. 1 is a block diagram illustrating each of a pair of trustees giving secret key information to each of a pair of users of a cryptosystem.

In April 1993, the Clinton Administration announced its intention to develop and produce cryptographic hardware for widespread use within the government. The hardware, or so-called Clipper Chip, is designed to provide secure communication after common secret keys have been established, but the announcement neither dealt with nor suggested a solution to the problem of secret-key exchange. The Clipper Chip will be made using a special VLSI process which is designed to prevent reverse engineering. In particular, the encryption and decryption algorithms used in the Clipper Chip will be classified, but the chip itself will not be classified. Each Clipper Chip will also contain a protected memory for secret keys, and such products are currently known in the industry. The protected memory is designed to prevent anyone (even the legitimate user of the chip) from gaining full access to the keys contained therein.

According to the announced specification for the Clipper Chip, each chip i will be equipped with a unique secret $K_i$ that is formed by a irreversible process from two pieces of the secret key $K_i(1)$ and $K_i(2)$. The pieces of the secret keys will be held by system-wide trusted agents $T_1$ and $T_2$. Actually, only one of the agents needs to be trusted since $T_1$ will hold only the first piece of each secret key and $T_2$ will hold only the second piece. When two parties wish to communicate using the new system, they first agree, in some way, on a session key S and then they enter this key into their respective chips. This key is used by the chips as an encryption/decryption key for the message traffic. In other words, once the session key is selected, the Clipper Chips function as a conventional private-key cryptosystem, but with the following difference. The Clipper Chips also transmit the session key S being used in encrypted form using the secret key for the chip, thereby allowing trusted agents to eavesdrop on the conversation. The reason for transmitting the session key in this fashion is to preserve court-authorized eavesdropping. In fact, when presented with a legitimate court order for eavesdropping the communications of a suspected user who encrypts his messages by means of Clipper Chip i, each of the two trustees will reveal the share of $K_i$ in its possession, so that the Police will be able to reconstruct $K_i$, the session key and thus the message of the suspected user.

In a first embodiment of this invention, referred to hereinafter as a hardware-based "trusting" scheme, it is assumed that there is a trusted agent T who wants to enable a group of N users (named 1 through N) to communicate privately among each other by using k-bit secret keys, assuming that no more than B of these N users will cooperate for the purpose of discovering the others' secret keys. On input N, B, and k, the trusted agent T chooses p to be a prime greater than N and k and randomly selects a B-degree bivariate polynomial F(x,y) mod p. That is, she selects $(B+1)^2$ random elements mod p. F(x,y) is thus known to the trusted agent and consists of $k(B+1)^2$ bits. The trusted agent T derives from main secret F(x,y) the individual key of every user. In fact, the individual secret key assigned by T to user i consists of the two univariate polynomials $P_i=P_i(y)=F(i,y)$ and $Q_i=Q_i(x)=F(x,i)$. $P_i$ and $Q_i$ constitute the secret key of chip i, while the number i is the public key of user i.

These individual secret keys allow two users i and j, i <j, to easily agree on a common secret key $K_{i,j}$; namely, $K_{i,j}=F(i,j)$. This value is computed by user i evaluating the secret polynomial $P_i$ at point j, and it is computed by user j evaluating the secret polynomial $Q_j$ at point i.

An adversary who has opened at most B chips cannot predict, in an information-theoretic sense, the secret pair of any two users. In this "trusting scheme" embodiment, the secret key of each user is 2k(B+1) bits long, while the corresponding public key consist of log N (<k) bits. Thus, the number of bits that must be remembered by each user depends on B but not on the total number of users N. Therefore, for the scheme to be practical (notwithstanding the difficulty of the trusted agent), the upper bound on the number of bad users should be reasonably small. For instance, if it is assumed that there are at most B=100 bad users in the system, and that k=100 is the common-key length, then it suffices that each user remember 20,200 bits, which should be acceptable in some scenarios.

Figure 2:
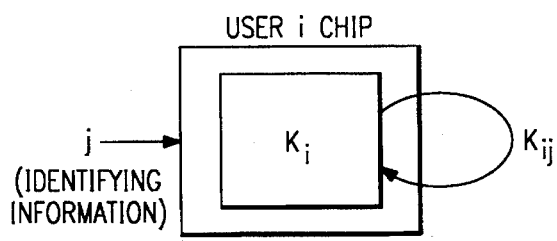
FIG. 2 is a simplified block diagram showing one of the users of FIG. 1 computing a private pair key from the other user's identifying information.
Figure 3:
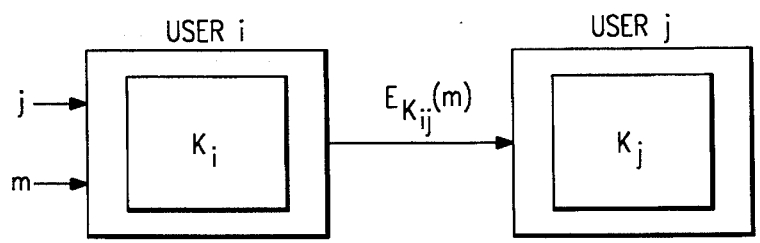
FIG. 3 is a simplified block diagram showing the user sending a ciphertext to the other user of the cryptosystem.

The "trusting" scheme is improved according to the invention to remove the concern that, at most, a few users may be bad. This alternate technique also uses secure hardware. At the outset, it is assumed that every user in the system communicates privately by means of a secure chip, like the Clipper Chip. The trusted authority T computes for each user i an individual key $K_i$ like in the trusting scheme or any other scheme that allows any pair of users i and j to agree on a common sufficiently secret key $K_{ij}$. Preferably, such a scheme should be one wherein knowledge of less than a given number (B>0) of individual keys does not enable one to understand the communications of other users. The trusted authority does not, however, give individual key $K_i$ to user i, rather the authority stores $K_i$ in a protected portion of a secure chip (chip i). The authority then gives chip i to user i. In this embodiment, no user knows his own key. Nonetheless, every user i can privately communicate to every other user j. In fact, chips i and j knowing, respectively, the individual secret keys of users i and j, can internally compute their common secret key $K_{ij}$, (as illustrated in FIG. 2), and thus encrypt and decrypt messages with that key (as illustrated in FIG. 3), as will be seen. While the decrypted messages will be output so as to make them readable to the recipient, it is preferable that the operations needed for computing the common key $K_{ij}$ will take place in the protected portion of the chips. Such a technique has advantages over the trusting scheme because individual keys are unavailable to the B users.

At this point, however, the system still needs to trust a central agent. This last difficulty can also be avoided according to a so-called "non-trusting" scheme. For simplicity, assume there are two trustees, $T_1$ and $T_2$, each acting as the central authority of the trusting scheme as illustrated in FIG. 1). Thus $T_1$ will choose individual keys $K^1_1, \ldots, K^1_N$ for the N users, and trustee $T_2$ will independently choose individual keys $K^2_1 \ldots K^2_N$. The key assigned to chip i is then be a combination of $K^1_i$ and $K^2_i$; and such combination may be their concatenation or their bit-by-bit sum modulo 2.

According to the invention, precautions must be taken so that only chip i knows $K_i$. Thus, it is preferred to have each trustee t store $K^t_i$ into chip i directly. For instance, chip i is first physically brought to trustee $T_1$ (or to some facility controlled by it) so that $T_1$ can privately store $K^1_i$ into the chip, and then chip i is sent to trustee $T_2$, who will privately store its own value $K^2_i$ into the chip. In this way, no one will learn both $K^1_i$ and $K^2_i$. In fact, once one of these values is stored into chip i, it will be unreadable by anyone. It will then be chip i itself to combine $K^1_i$ and $K^2_i$ internally so as to compute its own individual key $K_i$.

Alternatively, each trustee transmits its own share of key $K_i$ to the chip encrypted so that only chip i can understand it. For instance, chip i may generate its own public encryption key, known in particular to the trustees, and keep its own decryption key inside and thus protected. In this manner, there is no need that each trustee be physically provided every chip in order to store in it his own share of the individual key. In yet another alternative, each secure chip is manufactured so that it will generate its own individual key inside, compute two shares of this key, and inform each trustee of its own share. Preferably, this will be done in a secure manner, e.g., by having the chip transfer the shares encrypted, so that only the right trustee can understand its own share.

It should be noticed that in this hardware-based "non-trusting" scheme not all trustees must be trusted. In fact, for the scheme to be secure it is enough that at least one of them be trusted. Moreover, since trustees will be selected so as to be very trustworthy, the chance that at least one of them will be trustworthy should be greater than the chance, in the trusting scheme, that at most B users are bad.

Although the Clipper Chip announcement envisages a scenario with trustees and secure chips, such techniques use them merely to provide fair but conventional private-key cryptosystems, i.e., it enables private communication (wire-tappable in some proper cases) only between users who have already established a common secret key. To the contrary, the present invention uses the trustees and secure hardware in conjunction with other protocols to allow a pair of users to establish a common secret key.

In addition, it should be noticed that the non-trusting scheme, beyond providing a secret-key exchange protocol based on conventional methods, also guarantees court-authorized eavesdropping. In fact, after being presented with a legitimate court order, the trustees may release their own piece of the individual key of a suspected user i, so as to allow the police to monitor his communications. For further security, the trustees might disclose their own shares to a secure chip, used by the police to monitor the conversations of suspected users, so that no one, except the monitoring chip itself, will know the suspected user's individual secret key.

Both the trusting and non-trusting schemes can be adapted to work in a scenario where there are various gradations or "hierarchies" of security. For instance, assume that the users are categorized in S security levels, $1, 2, \ldots, S$, where level 1 is the highest level of security, and level S is the lowest level of security. Then, assume it is desired to provide a scheme for secret-key exchange that satisfies the two properties. First, users of different security levels can directly talk to one another (preferably using the same hardware and/or scheme). Second, a conversation between two users always takes place at the highest common level of security. In particular, in order for an adversary to eavesdrop on a conversation between a user of security level p and a user of security level q, where p<q, the adversary will need to open sufficiently many chips of level q or better, and opening chips at a lower level of security is of no use at all. The reference to security "hierarchies" herein does not mean that some users have better encryption algorithms or that people of higher security levels can spy on those with lower ones. Rather, the term means that, although every user can talk to any other user by the same scheme, compromising the keys of users of lower security does not help in computing the keys of users at higher levels.

Encryption schemes with different security levels are most important, particularly in a secure-chip scenario. In fact, there are likely to be fewer chips at the higher security level, and since they are likely to be guarded more closely, it will be much more difficult for an adversary to obtain such chips, and he will have to open more of them before being able to eavesdrop (since we can replace N by the number of users with that level of security, which is smaller).

The above properties are provided according to the present invention. In one embodiment, new individual keys using S independent set of individual keys as in any of the above-described schemes (i.e., both in a trusting and non-trusting scenario), are arranged so that the chips of security level S work as before, while the chips of higher security levels have more individual secret keys. For instance, let i be a chip of security level S. Then, i will securely carry an individual secret key, $K^s_i$. If the particular bivariate polynomial scheme is used to compute the individual keys as in the trusting case, $K^s_i = F_s(i,y), F_s(x,i)$; where $F_s(x,y)$ is a bivariate polynomial assigned to security level S. If, instead j is a chip of security level S−1, then it securely carries a secret individual key consisting of two keys: $K^s_j$ (i.e., its individual key as it were a chip of security level S) and a second "S−1 level" key $K^{S-1}j$. In particular, if the trusting scheme is used (with the specific bivariate polynomial method) $K^{S-1}_j = F_{S-1}(j,y), F_{S-1}(x,j)$; where $F_s(x,y)$ is a bivariate polynomial assigned to security level S−1. Thus a chip z of level q will have an individual key consisting of S+1−q individual keys, one for each level 1 between q and S. When a chip of level p wishes to communicate to a chip of level q, and p<q, then they may do so by using their q-level individual keys. Or, they may communicate by using all their individual keys from level S to level q. e.g., by means of a common secret key obtained by combining their common secret keys relative to security levels S through q.

Different security levels allow for a great deal of convenience. In an army, for instance, security level may grow with rank. In this way, any officer can still have a direct and private conversation with every soldier, but even if many ordinary soldiers are captured and their chips are successfully opened by the enemy, the enemy will never be able to eavesdrop conversations between officers.

Also, the present scheme makes it harmless to export cryptographic hardware and share cryptographic systems with foreign countries. Assume in fact that our system were adopted by a country C, so that national chips were given a higher security level than that of exported chips. Then, even if all foreign countries actively tried to open the encryption chips given to them, and succeeded in doing so for sufficiently many chips, no harm would result for C's national security. In fact, no one could eavesdrop conversations between two chips of country C.

According to still other embodiments of the invention, it is desirable to use secure chips along with conventional one-way functions. As before, assume N is the total number of users, B is the maximum number of chips openable by an adversary and k is the number of bits in each secret pair key (e.g., k=100). This aspect of the invention is implemented with a trusted agent (which computes special information for the users) or by relying instead on a group of "only moderately trusted" trustees.

In the trusted agent method, there are M secret keys $X_1, \ldots, X_M$ each with k bits that are generated at random and kept by the trusted agent. This agent also generates a public and private key for each user of the system as follows. The public key for user i will consist of M integers $a_1, \ldots, a_M$ selected at random from the interval [1,L], where L is a parameter of the system. The secret key stored in the unopenable portion of user i's chip consists of M (preferably k-bit long) strings $Y_1, \ldots, Y_M$ where $Y_m = h^{am}(X_m)$ for $1 \leq m \leq M$, and h is a suitably-chosen one-way function. For simplicity, h is considered an ideal one-way function that maps any input string x to a random, preferably k-bit long, output h(x). Also, one one-way function h is used for simplicity only as more than a single one-way functions may be used (i.e., one could use a different one-way function $h_j$ for each value $X_j$). When user i wants to send a message to user j, he does so by selecting a session key at random, which key is encrypted using a pair key $K_{i,j}$ that is generated as follows.

Let $a_1, \ldots, a_M$ be the public key for user i and let $\uparrow_1, \ldots, \uparrow T_M$ be the public key for user j. Then chip i computes $s_1, \ldots, s_M$ where $s_m = \max(a_m, \uparrow_m)$ for $1 \leq m \leq M$, and the chip combines the values $h^{s1}(X_1), \ldots, h^{sm}(X_M)$ into a single value $K_{i,j}$. For instance, the chip sets $$K_{i,j} = h(h^{s1}(X_1)/ \ldots \text{\^{A}} h^{sm}(X_M))$$

Where the symbol / denotes concatenation and h is, for simplicity only, the same function used above.

Note, therefore, that both chip i and chip j can compute $K_{i,j}$ given their own secret key and the public key of the other, thus allowing users i and j to have a private communication. Though the common secret key $K_{i,j}$ (if properly generated as a combination of the values $h^{s1}(X_1), \ldots, h^{sm}(X_M)$) could be known to users i and j, it is preferred that it be known only to their chips.

In this embodiment, the length of the public key for each user is about M log L bits, although this length can be reduced to log N bits if the public key for user i is generated using a public pseudo-random number generator with a seed based on i. For example, we might use h(i) as the public key for user i. The length of the secret key for each user is Mk bits, although the trusted agent may possess a much more compact representation, if it generates the users' secret keys in an algorithmic manner.

The above scheme can be modified for use with two or more trusted agents. For instance, it is desirable to use a set of t independent trustees, each one of which acts as the trusted agent such as described above. In this case, the overall common secret key key $K_{i,j}$ is a combination of t keys: the $K_{i,j}$-key relative to each trustee. This modification does not affect the security and the relevant properties of the trusted agent scenario.

The previous schemes also can be easily modified for use with security hierarchies. Let the users be categorized into S security levels $1, 2, \ldots, S$, where again level 1 is the highest level of security, and level S is the lowest level of security. Then, the invention implements the same scheme as described above except that the public key for a user at security level q is selected so that $a_m$ is a random integer in the range $[1+(q-1)L, qL]$ for $1 \leq m \leq M$.

This modification does not increase the storage requirement of chips with higher security level, but increases the time to compute a pair key by a factor of at most S, since chips belonging to users of higher security level will have to iterate the underlying one-way function more times. The modified scheme, however, allows all users (no matter what their security level) to utilize the same type of hardware, thus decreasing the price of the chips. It also allows users of different security levels to talk directly to one another in a secure and transparent way (i.e., the chips will perform the same type of operations, independently of the security levels involved). It also allows the conversation between the two users to always take place at the highest common level of security.

While secure chips are manufactured so that they cannot be "opened" at all, it is still desired to guard against the possibility that an adversary, with enough effort and money, can read a few bits from a chip before destroying it. If it is assumed an adversary were only capable of reading 5 bits from a secure chip before destroying it, then, in the non-trusting scheme, he would have to open Bk/5>B chips before eavesdropping any conversation (i.e., 2,000 chips if k=B= 100). In the one-way function scheme, however, the invention forces the adversary to open many more chips by simply increasing L. This is because learning 5 bits of $h^n(X_m)$ for many different n will be of little help to the adversary. By making L large, chips with the identical portions of the secret key will be few and far between. Increasing L also increases the time for a legitimate user to compute a pair key, but computing with one-way functions is very fast and can be made fairly large without difficulty.

According to a further feature of the invention, there is now described a "software-based" scheme for exchanging keys. This solution does not rely on any protected hardware at all. Starting again with the trusted agent scenario, there is a single secret key K which is held by the agent. The secret key for the ith user is $K_i=h(K/i)$. There is no public key for the ith user. There is a public pair key for each pair of users i and j, however, which is a simple and secure combination of their individual secret keys; for instance, $$t_{i,j}=h(K_j/i) \hat{e} h(K_i/j)$$

By "simple and secure combination" it is deemed to mean that with knowledge of the public pair key and any of its two individual keys, the other individual key may be easily computed, but given the public pair key only the two individual keys cannot be easily guessed.

The secret pair key used by i to send a message to j is $K_{i,j}=h(K_j/i)$. User i computes this key by retrieving the public pair key $t_{i,j}$ from his personal directory (or from the public directory) and then computing $t_{i,j} \hat{e} h(K_i/j)$. In fact, user i knows the identity j of the user he wants to talk to, and his own secret key $K_i$. This key $K_{i,j}$ is then used to encrypt a session key or a message directly. To read the message user j simply computes h $(K_{j/i})$. No table lookup is needed on the recovering end since j knows his own key $K_j$ and may easily learn the identity of the sender—e.g., i may send his own identity in the clear together with his encrypted message.

It is preferable that the trusted agent computes the individual user keys algorithmically, preferably, as a function of a "master key" K, as indicated above. However, the particular choice of $K_i=h(K/i)$ is just one of the many ways to generate $K_i$ algorithmically. It is also possible, however, to have the trusted agent choose $K_i$ in other secure ways; in particular, purely at random.

It should also be appreciated that the individual secret keys of the present scheme can also be stored by the trusted agent directly in secure chips, rather than given to the users. Alternatively, the users' individual keys can be stored in secure chips by the users themselves. There is, however, less reason to do so. In fact, a main advantage of the present scheme over the previous ones is that if an adversary learns the individual keys of a set of users (whether by corrupting them or by opening somehow their secure chips), he can only decipher communications involving that set of users. In other words, knowledge of $K_i$ or $h(K_i/j)$ can only be used to recover information about $h(K_j/i)$, which is only useful for communication with user i.

The scheme just described is, moreover, very economical to implement. The only potential disadvantage is that there are a potentially large (e.g., $N^2$) number of public pair keys. This disadvantage can be overcome by publishing a personalized directory of public pair keys for each user. In other words, each user can keep his own phone book of k-bit keys.. Alternatively, each user i can simply call up the trusted agent (using a 411-like phone call, for example) each time he wants to communicate with a new user j. The trusted agent, who knows the secret key K can then quickly recompute the public pair key, $t_{i,j}$, for the two users and send it to i. In such case the trusted agent does not need to store all the $N^2$ pair keys to answer these calls, because he can recompute any pair key instantly from his secret value K. This is a main advantage of choosing the individual user keys algorithmically as a function of KÁ Also, the trustee is only giving out public information in satisfying the request by sending $t_{i,j}$. Thus, there is no need to use encryption or special precautions for this transmission. In this embodiment there is also no specific need for authentication, since any user z Z i,j may request and obtain the public pair key $t_{i,j}$ without any harm to i's and j's privacy.

For these reasons, the call-up mechanism is particularly attractive. Indeed, the whole process can be easily automated— a user can dial in the identity of the two users i and j and then receive the 10-byte public pair key in response. Thus the effort needed to call up someone privately for the first time is at least as efficient as finding out the number of a user that is called for the first time in an ordinary telephone network.

Further, once a user obtains a public pair key, he can store it locally (electronically) so that if and when he calls that party again, the pair key can be retrieved automatically without a call to the trusted agent. Of course, a user that is on the receiving end of a message never needs to call the trusted agent for any information, since the receiver can trivially reconstruct the pair key.

The software-based scheme also works with multiple trusted agents, only one of whom needs to be honest. One approach is to have each trustee act, independently, as the trusted agent so that there will be an individual secret key $K^t_i$ for each user i and trustee t, and a common secret key $K^t_{i,j}$ for every users i and j and every trustee t. User i will send user j messages encrypted with a total common key $K_{i,j}$ which may be obtained by combining the t common secret keys relative to each trustee. Because every one of these t keys can be computed by the sender and by the receiver in any of the ways explained above, so can their total common secret key. Thus, for instance, if there are two trustees computing users' individual keys algorithmically and each trustee t provides user i with a public pair key $t'_{ij}$ in order to talk privately to user j, then when i wants to talk privately to j for the first time, he must make two phone calls to obtain the necessary information.

While the whole system can be securely implemented in software, it may be advantageous to make use of secure chips for some other ends. Assume, for instance, that the trustees are government agencies unwilling to provide responses to call-up inquiries. In this case, the trustees can use telephone companies or others to provide the users the necessary public pair keys without making such entities de facto trustees. For instance, each trustee may provide a telephone company with a secure chip which contains in its protected memory the trustee's master secret key or sufficient information to compute the public pair keys. The telephone companies may then use these chips for computing the public pair keys, in response to users' requests in a call-up manner, without ever learning the trustees' master keys, and thus without being ever able to illegally eavesdrop any conversation. The trustees will then be used solely for law-enforcement purposes. For instance, they will, when presented a legitimate court order, provide the secret individual key. Secure chips, however, may not be needed even for this application, for instance, if the trustees provide the phone companies with the complete set of public pair keys.

It should be appreciated by those skilled in the art that the specific embodiments disclosed above may be readily utilized as a basis for modifying or designing other methods and techniques for carrying out the same purposes of the present invention. It should also be realized by those skilled in the art that such equivalent methods do not depart from the spirit and scope of the invention as set forth in the appended claims.

We claim:

1. A method for enabling users of a cryptosystem to generate and use a private pair key for enciphering communications between the users, comprising the steps of:

for each user and each trustee of a group of at least two trustees, having at least one user individual key;

for each user, storing at least some of the user's individual user keys in a physically-secure device;

having each of the users compute the private pair key in a physically-secure device from information that includes information stored in the user's physically-secure device and identifying information of the other user, wherein the private pair key cannot be computed by a subset of of trustees containing less than a given number of trustees;

having one of the users generate a ciphertext using the private pair key: and transmitting the ciphertext from the user to another user of the cryptosystem.

2. The method as described in claim 1 wherein some of the users belong to different security levels.

3. The method as described in claim 2 wherein the individual user keys of a group of users of a first security level contain no useful information for computing the private pair key of a pair of users of a second security level.

4. A method for enabling users of a cryptosystem to generate and use a private pair key for enciphering communications between the users, comprising the steps of:

generating at least one public key for each user by iterating at least a conventional one-way function on at least one private value stored in a physically-secure device;

using the physically-secure device of each of a pair of users to compute the private pair key for the pair of users, wherein the private pair key is computed based on information that includes one user's private information and the other user's public key;

having one of the users generate a ciphertext using the private pair key: and transmitting the ciphertext from the user to other user of the cryptosystem.

5. The method as described in claim 4 wherein some of the users belong to different security levels.

6. The method as described in claim 9 wherein private information relative to users of a first security level is substantially useless for computing the private pair key of a pair of users of a second security level.

7. A method for enabling users of a cryptosystem to generate and use a private pair key enciphering communications between the users, comprising the steps of:

for each user and each trustee of a group of trustee of a group of trustees, generating at least one public key by iterating at least a conventional one-way function on at least one private value stored in a physically-secure device;

having at least one of the two users use a physically-secure device to compute the private pair key from information that includes private information of the user and the other user's public key, wherein a subset of trustees containing less than a given number of trustees does not possess any useful information for reconstructing the private pair key;

having one of the users generate a ciphertext using the private pair key; and transmitting the ciphertext from the user to other user of the cryptosystem.

8. The method as described in claim 7 wherein some of the users belong to different security levels.

9. A method for enabling two users of a cryptosystem to generate and use a private pair key to encipher communications between the two users, comprising the steps of:

for each user and each trustee of a group of trustees, having at least one individual user key;

having at least one of the two users receive and store in a physical device at least a public pair key for the two users;

having at least one of two users use the physical device to compute the private pair key from information that includes the user's individual user key and the public pair key stored by one of the users, wherein a subset of trustees containing less than a given number of trustees does not possess any useful information for reconstructing the private pair key;

having one of the users generate a ciphertext using the private pair key; and transmitting the ciphertext from the user to other user of the cryptosystem.

10. The method as described in claim 9 wherein the individual user key of each user is stored in a physically-secure device.

11. The method as described in claim 9 wherein a plurality of individual user keys of a user are combined into a single individual user key.

12. The method as described in claim 9 wherein at least some public pair keys are computed by an entity that cannot compute individual user keys.

13. The method as described in claim 12 wherein the entity is prevented from computing individual user keys because such keys are stored in physically-secure devices.

14. The method as described in claim 9 wherein trustees reveal individual user keys of a given user for the purpose of enabling monitoring of communications relative to that user while preserving privacy of the communications of other users.

15. A method for enabling two users of a cryptosystem to generate and use a private pair key to encipher communications between the two users, comprising the steps of:

for each user and each trustee of a group of trustees, having at least one individual user key;

having at least one of the two users receive at least a public pair key for the two users, wherein at least one public pair key is computed by an entity that cannot compute all individual user keys;

having at least one of the two users use a physical device to compute the private pair key from information that includes the user's individual user key and at least one public pair key, wherein a subset of trustees containing less than a given number of trustees does not possess any useful information for reconstructing the private pair key;

having one of the users generate a ciphertext using the private pair key; and transmitting the ciphertext from the user to other user of the cryptosystem.

16. The method as described in claim 15 wherein the entity is prevented from computing individual user keys because such keys are stored in physically-secure devices.

17. The method as described in claim 15 wherein trustees reveal individual user keys of a given user for the purpose of enabling monitoring of communications relative to that user while preserving privacy of the communications of other users.

18. A method for enabling two users of a cryptosystem to generate and use a private pair key to encipher communications between the two users, comprising the steps of:

for each user and each trustee of a group of trustees, having at least one individual user key;

having at least one of the two users receive at least a public pair key for the two users;

having at least one of two users use a physical device to compute the private pair key from information that includes the user's individual user key and the public pair key received by one of the users, wherein a subset of trustees containing less than a given number of trustees does not possess any useful information for reconstructing the private pair key, and wherein a subset of trustees containing more than a given number of trustees can reconstruct individual user keys of a given user for the purpose of enabling monitoring of communications relative to that user while preserving privacy of the communications of other users;

having one of the users generate a ciphertext using the private pair key; and transmitting the ciphertext from the user to other user of the cryptosystem.

19. The method as described in claim 18 wherein at least some public pair keys are computed by an entity that cannot compute individual user keys.

20. The method as described in claim 19 wherein the entity is prevented from computing individual user keys because such keys are stored in physically-secure devices.

21. A method for enabling two users of a cryptosystem to generate and use a private pair key to encipher communications between the two users, comprising the steps of:

for each user and each trustee of a group of trustees, having at least one individual key;

having at least one of the two users receive from a trustee information for the two users from which the user derives and stores, in a physical device, key information;

having at least one of two users use the physical device to compute the private pair key from information that includes the user's individual user key and the stored key information, wherein a subset of trustees containing less that a given number of trustees does not possess any useful information for reconstructing the private key;

a subset of trustees containing less than a given number of trustees does not possess any useful information for reconstructing the private pair key;

having one of the users generate a ciphertext using the private pair key; and transmitting the ciphertext from the user to other user of the cryptosystem.

22. The method as described in claim 21 wherein the individual user key of each user is stored in a physically-secure device.

23. The method as described in claim 21 wherein a plurality of individual keys of a user are combined into a single individual key.

24. The method as described in claim 21 wherein at least some key information is computed by an entity that cannot compute individual keys.

25. The method as described in claim 29 wherein the entity is prevented from computing individual keys because such individual keys are stored in physically-secure devices.

* * * * *